United States Patent
Buse

(10) Patent No.: US 9,440,769 B2
(45) Date of Patent: Sep. 13, 2016

(54) PLATFORM FOR USE IN A LOGISTIC SYSTEM

(76) Inventor: Heinz Buse, Bad Zwischenahn (DE)

( * ) Notice: Subject to any disclaimer, the term of this patent is extended or adjusted under 35 U.S.C. 154(b) by 607 days.

(21) Appl. No.: 13/993,921

(22) PCT Filed: Dec. 16, 2011

(86) PCT No.: PCT/EP2011/073125
§ 371 (c)(1),
(2), (4) Date: Jul. 11, 2013

(87) PCT Pub. No.: WO2012/080499
PCT Pub. Date: Jun. 21, 2012

(65) Prior Publication Data
US 2014/0008509 A1    Jan. 9, 2014

(30) Foreign Application Priority Data

Dec. 16, 2010   (DE) .................. 10 2010 063 310

(51) Int. Cl.
*B65D 19/00*    (2006.01)
*B65G 67/20*    (2006.01)
*B65D 19/42*    (2006.01)

(52) U.S. Cl.
CPC .......... *B65D 19/0002* (2013.01); *B65D 19/42* (2013.01); *B65G 67/20* (2013.01); *B65D 2519/0098* (2013.01)

(58) Field of Classification Search
CPC ................................................ B65D 19/0002
See application file for complete search history.

(56) References Cited

U.S. PATENT DOCUMENTS

| 3,592,145 A * | 7/1971 | Petry ................. B65D 19/0002 108/57.21 |
| 3,690,485 A | 9/1972 | Fischer et al. |
| 2008/0250986 A1 | 10/2008 | Boon |
| 2009/0047105 A1* | 2/2009 | Kauhanen ............ B65G 67/20 414/400 |

(Continued)

FOREIGN PATENT DOCUMENTS

| AU | 2004291426 A1 | 6/2005 |
| DE | 2501414 A1 | 7/1975 |
| DE | 20016115 U1 | 2/2001 |

(Continued)

OTHER PUBLICATIONS

European Patent Office, Search Report issued in International application No. PCT/EP2011/073125 dated Jun. 12, 2012.

*Primary Examiner* — Jonathan Snelting
(74) *Attorney, Agent, or Firm* — Wood, Herron & Evans, LLP

(57) ABSTRACT

A platform is described for use in a logistic system such as by being placed onto the loading surface of a vehicle in a conveying or haulage direction (A) and by being taken from the loading surface of a vehicle in the same direction. The platform has dimensions that are substantially adapted to the loading surface of the vehicle. The platform has at least one first platform element and one second platform element, which can be locked to each other and released from each other. The first platform element has a locking element and the second platform element has a locking receptacle provided facing the locking element in such a way that the locking receptacle of the second platform element can engage with the locking element of the first platform element.

19 Claims, 9 Drawing Sheets

(56) References Cited

U.S. PATENT DOCUMENTS

| | | | |
|---|---|---|---|
| 4,966,275 A * | 10/1990 | Hallstrom, Jr. | B65G 25/065 198/750.6 |
| 5,186,596 A | 2/1993 | Boucher et al. | |
| 5,911,555 A * | 6/1999 | Foster | B65G 69/003 198/583 |
| 2007/0176048 A1 * | 8/2007 | Huber | B64C 1/061 244/119 |
| 2008/0213058 A1 | 9/2008 | Simmons et al. | |

FOREIGN PATENT DOCUMENTS

| | | |
|---|---|---|
| DE | 202009009055 U1 | 9/2009 |
| DE | 202009016799 U1 | 6/2010 |
| EP | 1808387 A2 | 7/2007 |
| FR | 2927617 A1 | 8/2009 |
| GB | 2447503 A | 9/2008 |
| WO | 2005049461 A1 | 6/2005 |
| WO | 2007041776 A1 | 4/2007 |

* cited by examiner

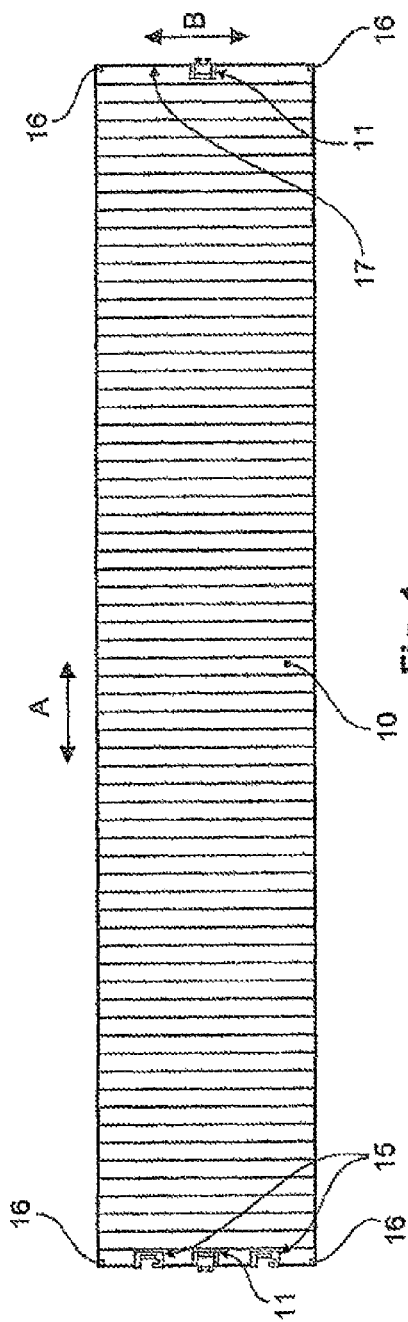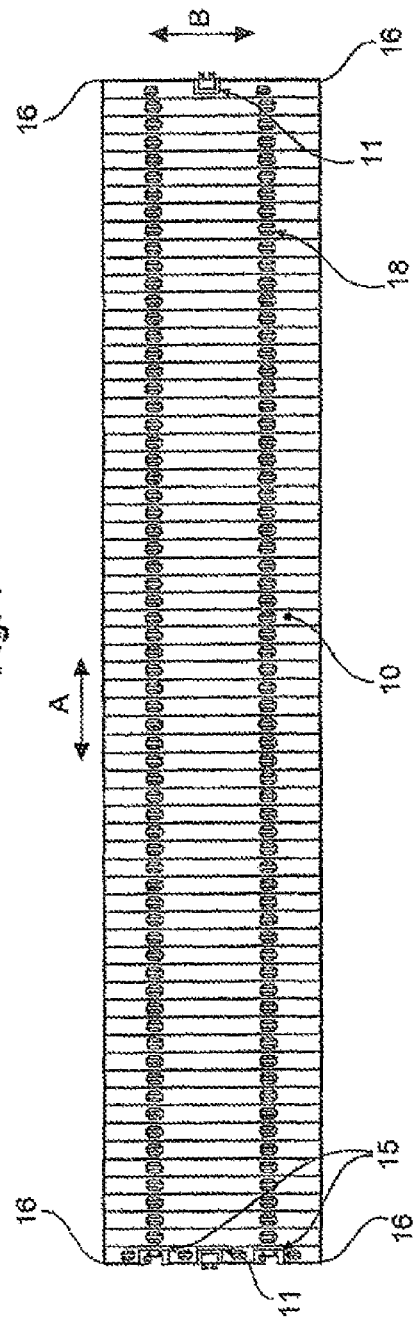

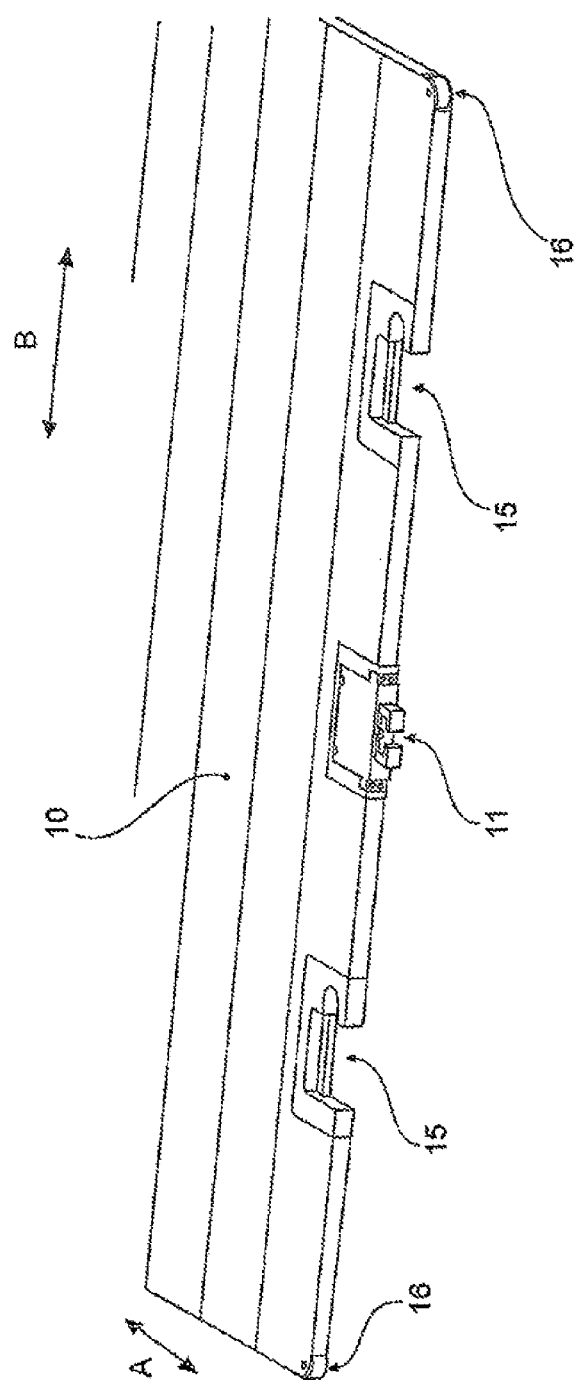

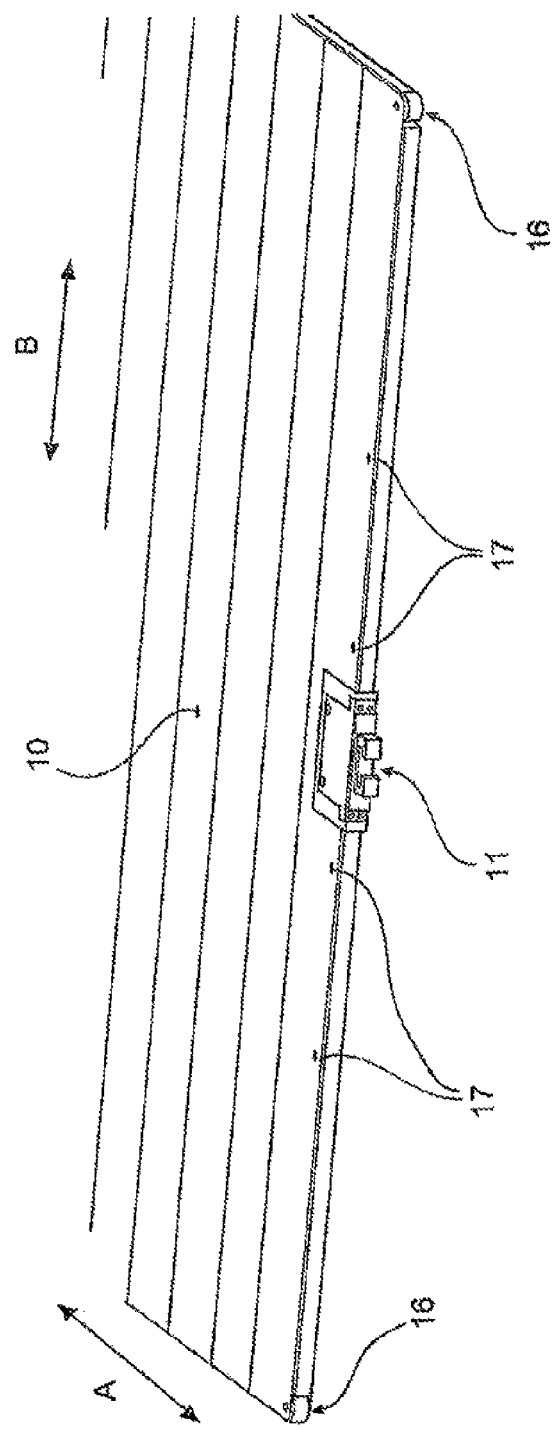

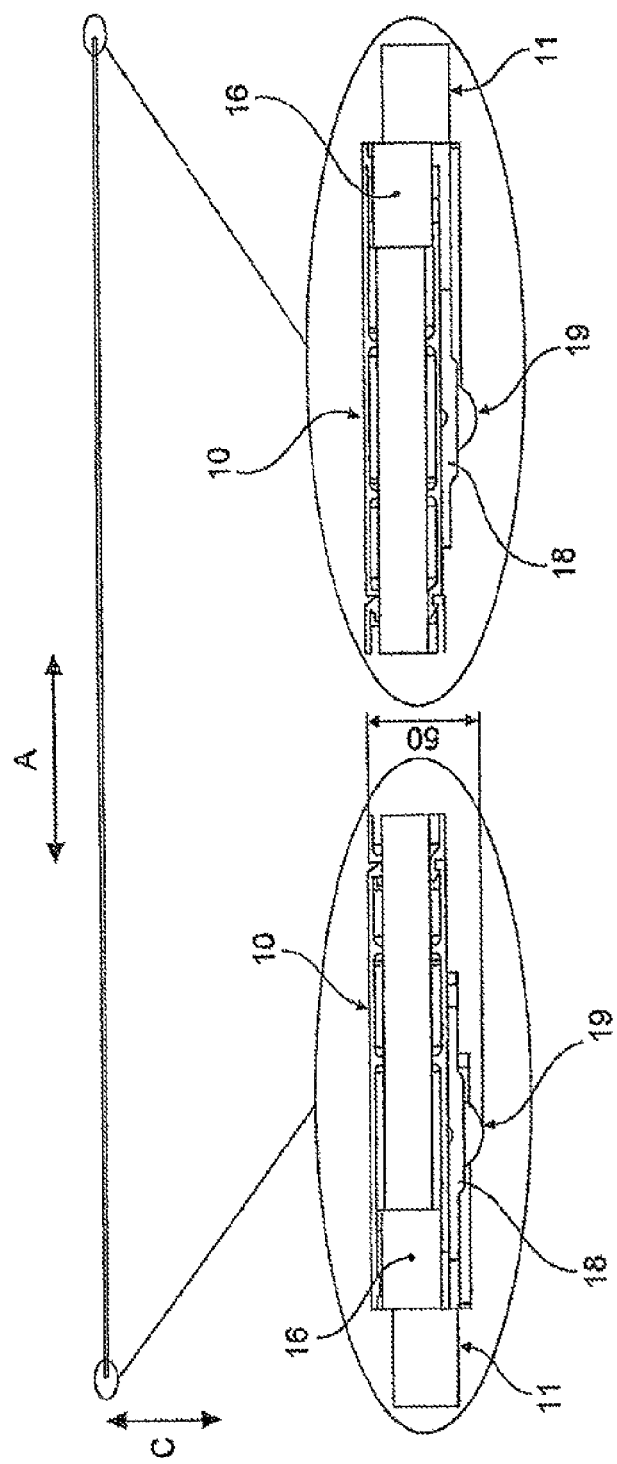

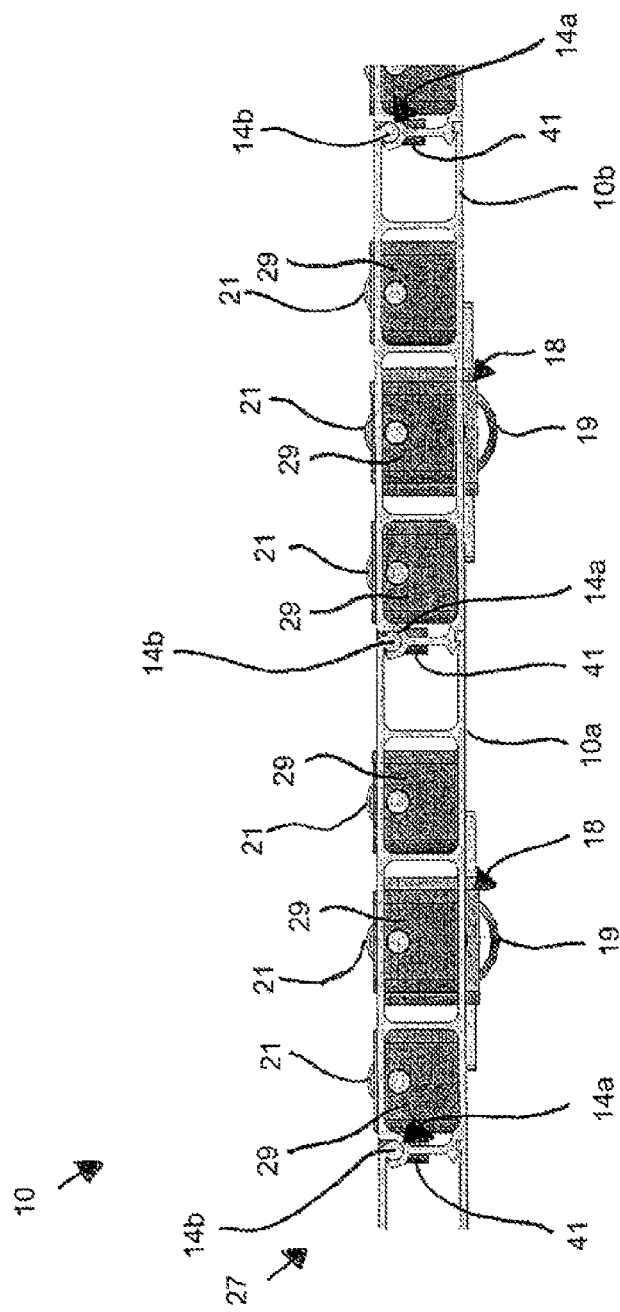

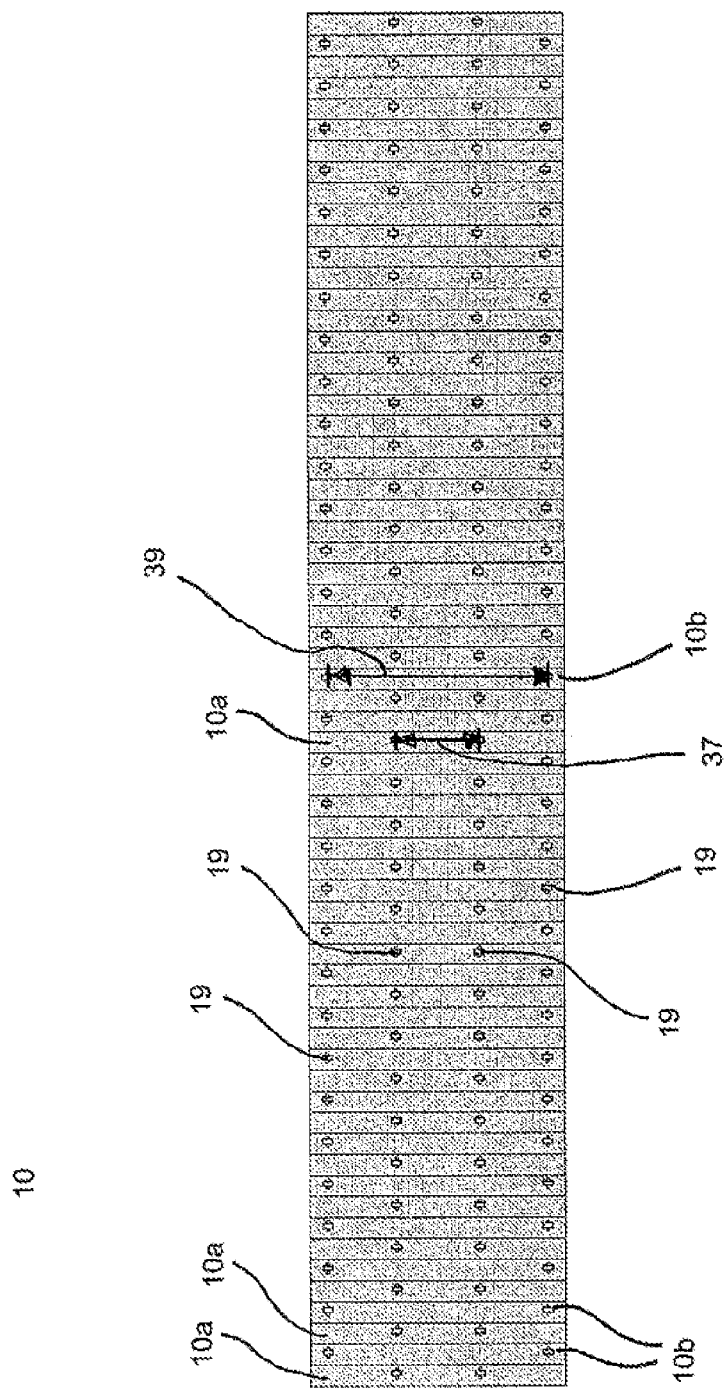

PLATFORM FOR USE IN A LOGISTIC SYSTEM

CROSS-REFERENCE TO RELATED APPLICATIONS

This application is a U.S. national phase application of PCT/EP2011/073125, filed Dec. 16, 2011, which claimed priority to German patent application DE 10 2010 063 310.0, filed Dec. 16, 2010. Each of these applications is incorporated by reference herein in its entirety.

TECHNICAL FIELD

The present invention relates to a platform for use in a logistics system.

BACKGROUND

In existing warehouses or order-picking units, there are a large number of docking stations, (also referred to as factory doors) to which the trucks can be advanced up, by way of their rear side in each case, in order to receive the goods. Such warehouses or order-picking units exist in large numbers and it is often possible for a multiplicity of vehicles to be advanced simultaneously up to the docking stations, which are respectively located one beside the other, in alignment with one another, in a building wall. It is thus possible for as many trucks to dock as there are docking stations, that is to say building-wall openings/factory doors. These docking stations are usually arranged level with the loading areas of the trucks, in order that the warehouse floor and the loading area of the truck form a single plane and the truck can be loaded and unloaded, for example, by fork stackers moving thereon. Since it is the case, with this kind of loading and unloading, that each fork stacker or other kind of transporting apparatus can transport only one goods pallet, or a small number of goods pallets, this kind of loading and unloading is very time-intensive. It is also the case that the truck which is to be loaded and unloaded cannot be moved away from the docking station throughout the duration of the loading and unloading operation.

EP 1 808 387 A2, which should be considered to be the closest prior art, discloses a logistics system in which the freight which is to be loaded and unloaded is stored on a goods platform, also referred to as a platform or load carrier, and the platform as a whole, together with the freight, is taken off the truck, or put onto the truck, in one operation. That is to say the platform as a whole, with the goods, can be transferred to a vehicle in a single step or can be received from a vehicle in a single step.

The invention is based on the object of further improving the platform of the aforementioned logistics system.

SUMMARY

This object is achieved according to the invention by a platform having the features described in further detail below.

Therefore, the invention provides a platform for use in a logistics system, in order to be transferred onto the loading area of a vehicle in a haulage direction and/or to be received from the loading area of a vehicle in a haulage direction. The platform essentially has dimensions which are adapted to the loading area of the vehicle. The platform has at least one first platform element and one second platform element, which can be locked to one another, but can also be released from one another. The first platform element has a locking element and the second platform element has a locking holder, provided opposite the locking element, such that the locking holder of the second platform element can latch into the locking element of the first platform element.

It is advantageous, in the case of the platform according to the invention, that the latter is of modular construction. It is thus possible for the individual platform elements to be assembled to form a platform and thus for the size of the platform to be adapted to different loading-area sizes or use purposes. Latching one platform element into another can establish a straightforward, quick and robust connection between the platform elements. This connection can also be released again.

It is further possible for an already loaded platform thus to be extended by further platform elements, since the latching-in action for joining the platform elements together does not require any interventions or mounting operations to be carried out on the first, loaded platform.

According to one aspect of the invention, the locking element of the first platform element and the locking holder of the second platform element are each provided on the underside of the platform element. In this arrangement, that surface of the platform on which the goods and articles can be provided is not adversely affected or obstructed by the locking elements.

According to a further aspect of the invention, the first platform element has a recess, in which a protrusion of the second platform element can engage by way of a pivoting movement about a horizontal axis perpendicularly to the haulage direction. This allows the second platform element to be latched into the first platform element, as is known, for example, from click laminate. The recess here serves both for positioning the second platform element in relation to the first platform element and for guiding the pivoting movement, and also as a further retaining means between the two platform elements in the locked state.

The present invention likewise relates to a platform for use in a logistics system, in order to be transferred onto the loading area of a vehicle in a haulage direction and/or to be received from the loading area of a vehicle in a haulage direction. The platform essentially has dimensions which are adapted to the loading area of the vehicle. The platform, on at least one lateral edge, has a roller which is provided such that it can be rotated about the vertical axis and is designed to protrude beyond the lateral dimensions of the platform.

The advantage with this platform according to the invention is that the lateral roller can provide lateral guidance and support, for example, in relation to a side wall of the loading area of a vehicle or the lateral boundary of a transfer station, provided for transferring the platform onto the loading area of a vehicle and/or for receiving the platform from the loading area of a vehicle. It is thus possible to improve the lateral guidance of the platform during the transfer and/or receiving operation, since the possibility of the platform jamming or tilting is reduced.

According to one aspect of the invention, at least one roller is provided at a corner of the platform. This makes it possible to ensure the lateral guidance of the platform throughout the movement operation, since the corners of the platform are first to come into contact with, for example, the lateral boundary of a transfer station. In particular at least one lateral roller at a corner of the platform can facilitate introduction, for example, into the transfer station since jamming or tilting is more likely to occur here than during the haulage movement.

The present invention likewise relates to a platform for use in a logistics system, in order to be transferred onto the loading area of a vehicle in a haulage direction and/or to be received from the loading area of a vehicle in a haulage direction. The platform essentially has dimensions which are adapted to the loading area of the vehicle. The platform has an engagement means, in which a haulage means can engage in order to pull the platform from the loading area of the vehicle in the haulage direction.

The advantage here is that the engagement means allow the platform to be moved downward and/or out, quickly and straightforwardly, from the loading area of a vehicle or also from a transfer station or a store or the like in which empty and/or loaded platforms can be stored.

According to one aspect of the invention, the platform has a compression spring, in order for the engagement means to be pushed out of the platform in the haulage direction. The engagement means can thus be moved into an engagement position, and therefore the haulage means can straightforwardly and reliably grip, and pull, the platform.

According to a further aspect of the invention, the platform is provided, and the compression spring is dimensioned, such that the engagement means can be pushed all the way into the platform and accommodated by the platform. It is thus possible for the engagement means, in the state in which it has been pushed out by the compression spring, to project out of the platform such that it can be gripped reliably, straightforwardly and quickly by a haulage means and, at the same time, can be pushed into the platform such that it does not project beyond the same, nor be damaged or cause an obstruction. It is thus possible, for example, for the platform, the compression spring and the engagement means to be provided, and dimensioned, such that the engagement means is pushed in by, for example, the loading ramp of the vehicle and thus does not project obstructively beyond the rear edge of the platform and hinder the closure of the loading-area wall or the swinging-up action of the loading ramp. It is further possible, when the loading area is being lowered, for the engagement means to be pushed out of the platform by the compression spring, so that with immediate effect, i.e. once the loading area has been opened or the loading ramp has been lowered, it is ready for use, in order to pull the platform downward from the loading area of the vehicle, without any additional intervention on the part of a user.

According to a further aspect of the invention, the platform has a plurality of rollers which are incorporated in roller casings, in order to be shifted on these rollers in the haulage direction. The rollers make it possible for the platform to be shifted. Incorporating the rollers in roller casings in the platform can give rise to a compact and flat construction.

According to one aspect of the invention, the platform, with rollers and roller casings, has an overall height of not more than 50 mm. This can give rise to a very flat and compact construction of the platform, which does not take up any more height than absolutely necessary on the loading area of a vehicle.

According to a further aspect of the invention, the platform consists essentially of aluminum. This allows the platform to be very lightweight, in order for it to be possible for the haulage operation to be carried out as straightforwardly as possible and with low driving and/or pulling forces on the part of the haulage means. This also means that the vehicle hauls the smallest possible amount of additional weight.

According to a further aspect of the invention, all common industrial trucks can be moved on the load carrier. This allows industrial trucks to load and unload the load carrier and/or assist in this operation.

According to a further aspect of the invention, a loaded platform ($25t$) can be moved on the platform. This means that a fully loaded load carrier ($25t$) can be pulled/rolled over an empty load carrier (sandwich principle). This allows a loaded load carrier (platform) to be hauled over an unloaded load carrier, in order for it to be possible for two load carriers to be exchanged for one another in a space saving manner on the loading area of a vehicle and/or in a holder of a transfer station.

The invention according to one of the above-described aspects and/or according to one of the above-described preferred embodiments is advantageously developed by the platform having a plurality of rollers which extend, at least in part, out of a loading surface of the platform. The rollers, which are arranged in this way on the upper side of the platform, facilitate the movement of loaded goods, for example of pallets or cartons, on the loading surface. It is thus possible for the load items simply to roll over the platform, or to be transported onto the same and/or downward from the same. This can be done preferably by means of a stacker, or particularly preferably by a tilting action, in other words an end surface of the platform being raised on one side. The resulting sloping position of the platform causes the load items to begin to shift along the rollers on the loading surface in the direction of the resulting gradient.

The rollers are preferably incorporated in each case individually or in groups in the roller casings or in separate roller casings. In particular in the case where the rollers for the upper side of the platform are arranged in the same roller casings as the rollers for the underside of the platform, it is possible for all the rollers to be exchanged simultaneously in only a small time frame. As an alternative to this, arranging the upper-side rollers in respectively separate roller casings proves to be advantageous to the extent that defective rollers can be exchanged individually without all the rollers, or a large number of rollers which are still intact, having to be exchanged.

The rollers are preferably arranged one beside the other in the longitudinal direction of the platform in two or more main rows, and further preferably in one or more secondary rows. The spacings between two adjacent rows (main and/or secondary row) on the loading surface of the platform are preferably each in the region of 400 mm or less. The spacing of 400 mm or less is particularly advantageous when it is taken into account that a length of 800 mm corresponds to the shorter edge length of a Europool pallet according to EN 13698-1, also referred to as a Euro pallet. In the case of a spacing equal to half or less of each edge length, Europool pallets arranged on the platform are thus always located one beside the other at least on two rollers, this ensuring stable transportation of the load items. The smaller the expected load for transportation, the smaller the spacing between two adjacent rows on the upper side of the platform—the loading surface—is preferably chosen to be. The spacing between the rows, in addition, can be adjusted preferably via the corresponding roller casings being rearranged.

In a further preferred embodiment, the roller casings, incorporated in the platform, on the at least one first platform element are arranged at a first spacing from one another, and those on the at least one second platform element are arranged at a second spacing, which differs from the first spacing. Further preferably, the platform has a multiplicity of first and second platform elements, which are arranged to alternate with one another and are locked to one another. This has the advantage, in particular in conjunction with the above-explained different spacings of the roller casings for the first platform element and the second platform element, that the platform—as seen in the longitudinal direction of the platform—is mounted, not on two rows of rollers, but rather on four rows of rollers, as a result of which the stability of the platform is significantly improved.

In yet a further preferred embodiment of the invention, the first and second platform elements are fixed relative to one another in the transverse direction of the platform, and are arranged preferably parallel to one another and in alignment in the longitudinal direction of the platform, by means of securing bolts, which are each arranged between two adjacent platform elements. Providing securing bolts, preferably located opposite one another along the periphery of the platform, on the underside and/or upper side thereof, facilitates the positioning of adjacent platform elements for more straightforward and quicker locking.

BRIEF DESCRIPTION OF THE DRAWINGS

Exemplary embodiments and advantages of the invention will be explained in more detail hereinbelow with reference to figures which follow, in which:

FIG. 1 shows a plan view of a platform;

FIG. 2 shows the platform in a view from beneath;

FIG. 3 shows a perspective view of the platform from above;

FIG. 4 shows a further perspective view of the platform from above;

FIG. 5 shows, in the upper region, a side view of the platform and, in the lower region, two detail-form views of the left-hand and right-hand edge of the platform;

FIG. 10 shows a simplified (lateral) detail-form view of the platform according to FIGS. 7 to 9; and FIG. 11 shows a view from beneath of the platform according to FIGS. 7 to 10.

DETAILED DESCRIPTION

Figure 6:
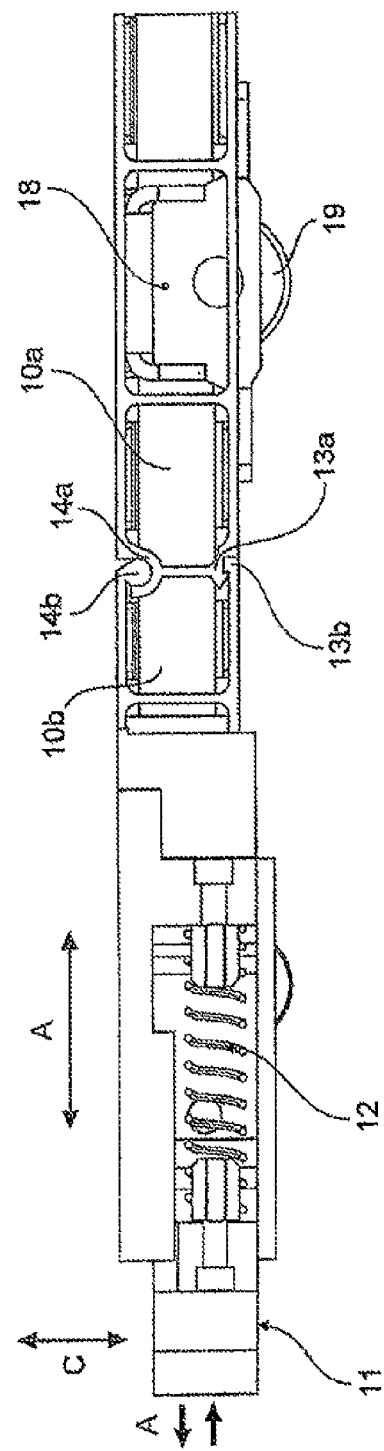
FIG. 6 shows a further detail-form view of the platform.

Structurally and/or functionally similar or identical parts in the two exemplary embodiments shown are given identical designations. To this extent, reference is made in each case to what is said in respect of the respective exemplary embodiment.

FIG. 1 shows a plan view of a platform 10. The platform 10 may also be referred to as a load carrier or goods platform 10. The platform 10 is adapted essentially to the dimensions of the loading area of a vehicle, e.g. of a truck or trailer or semitrailer. It is thus possible, for example, for the platform 10 to have a length of 13.405 m in its longitudinal direction A and a width of 2.440 m in its transverse direction B.

The platform 10 is intended to reproduce the loading area of a vehicle. It is thus possible for the platform 10, loaded with goods, to be used, e.g. within the context of a logistics system, for being shifted onto the loading area of a vehicle or moved downward from the loading area of the vehicle. This allows the operation of loading and unloading a vehicle with goods to be accelerated to a considerable extent, since there is no need for the loading area of the vehicle to be loaded and unloaded, for example in a pallet-like manner, by a fork stacker; rather, it is possible to exchange the entire loading area of the vehicle in the form of the platform 10.

For this purpose, the platform 10 is shifted in the haulage direction A. For this purpose, the platform 10 has, on its underside, a multiplicity of rollers 19 accommodated in roller casings 18 (see FIG. 2). On its upper side, the platform 10 is formed essentially as a planar and smooth surface, in order that articles, for example on pallets, can be arranged in a flexible manner on the platform 10. It is possible here for retaining points or lashing points to be provided on the surface of the platform 10, in order to allow the goods to be fastened on the surface of the platform 10. Furthermore, the surface of the platform 10 may be configured with grooves or depressions, in order for the roughness of the surface of the platform 10 to be increased. This makes it possible, in particular in damp conditions, to reduce the risk of slipping, e.g. for individuals or also for fork stackers.

In order to be pulled downward from the loading area, or pulled out of a transfer station, the platform 10, on at least one of its narrow edges, has at least one engagement means 11, which may be designed, for example, as a pulling lug 11. The pulling lug 11 here projects beyond the edge of the platform 10 in the haulage direction A, i.e. in the longitudinal direction A, at least to the extent where a haulage means, e.g. a hook, can engage in the pulling lug 11, in order to pull the platform 10 in the haulage direction A. The pulling lug should be provided here such that, even in the case of a platform 10 being loaded right up to the edge, it can be gripped, i.e. it is not concealed by the articles on the platform 10 such that the hook cannot engage in the pulling lug 11. It is also the case that the pulling lug 11 is provided such that it has a compression spring 12 and, for example, by virtue of a loading ramp of a truck being swung up, can be pushed into the platform 10 at least to the extent where the loading ramp of the truck can close fully, i.e., during closure of the loading area, the pulling lug 11 does not obstruct the loading ramp or the doors or the like of the loading area (see also FIG. 6).

The platform 10, on at least one of its narrow edges, has at least one platform-securing means 15, which may be provided, for example, in the form of a lug 15. The lug 15 serves as a holder for a load-carrier-securing means, which can connect the platform 10 in relation to the loading area of the truck such that, in particular when the truck is traveling, movement of the platform on the loading area of the truck in the haulage direction A is prevented. For this purpose, the loading area of the truck may have, for example, corresponding depressions, in which, for example, securing bolts engage through the lug 15.

The platform 10, on its narrow edge located opposite the platform-securing means 15, also has at least one accommodating bore 17, in which an end stop and/or a rolling-prevention means may be provided.

Furthermore, FIG. 1, at all four corners of the platform 10, shows lateral rollers 16 which project both longitudinally and transversely to a slight extent beyond the dimensions of the platform 10 such that they can allow the platform 10 to roll for example in relation to a side wall of the loading area of a truck, but do not increase the dimensions of the platform 10 to any significant extent (see also FIGS. 3 to 6).

FIG. 2 shows the platform 10 in a view from beneath. The elements and designations correspond to those in FIG. 1. FIG. 2 also shows the roller casings 18, which are incorporated in the underside of the platform 10 and in which the rollers 19 are provided.

FIG. 3 shows a perspective view of the platform 10 from above. FIG. 4 shows a further perspective view of the platform 10 from above. FIG. 3 here shows the left-hand edge of the platform 10 from FIGS. 1 and 2, this left-hand edge being oriented, for example toward the opening of the loading area of a truck. FIG. 4 shows the right-hand edge of the platform 10 from FIGS. 1 and 2, this right-hand edge being directed toward the interior of the loading area of a truck. The elements and designations in FIGS. 3 and 4 correspond to those in FIGS. 1 and 2.

FIG. 5 shows, in the upper region, a side view of the platform 10 and, in the lower region, two detail-form views of the left-hand and right-hand edges of the platform 10. The elements and designations correspond to those in FIGS. 1 to 4. The two lower detail-form views in FIG. 5 each illustrate the arrangement of the lateral roller 16, which is provided in each case such that it can be rotated about the vertical axis C and is located at a corner of the platform 10. The pulling lug 11 is illustrated in a state in which it projects beyond the platform 10 in the haulage direction A.

The illustration also includes the rollers 19 being incorporated in the roller casings 18 in the platform 10 such that they project only slightly beyond the underside of the platform 10. This can give rise to as flat and compact a construction of the platform 10 as possible, and therefore the platform 10 of the loading area of the truck takes up only a small amount of height.

FIG. 6 shows a further detail-form view of the platform 10. This figure illustrates the elements located in the interior of the left-hand edge of the platform 10, i.e. of that side which is directed toward the tail of a truck, i.e. toward the opening of the loading area of a truck. An illustration is thus given of the pulling lug 11 with the compression spring 12. The edge of the platform 10 here is configured such that the platform 10 contains a recess or a cavity in which the compression spring 12 is provided against an end stop such that it can be pushed in by the pulling lug 11 in the haulage direction A. The recess of the platform 10, and the dimensioning of the force of the compression spring 12, should be provided here such that the pulling lug 11 can be pushed into the recess of the platform 10 at least to the extent where it does not hinder, for example, the closure of the loading area of the truck. It is possible here for the pulling lug 11 to be pushed in for example by virtue of a loading ramp of the truck being swung up. It is also possible for the pulling lug 11 to take place into the platform 10 by virtue of the doors of the loading area being closed.

It is a special feature of the platform 10 according to the invention that it may be constructed in modular form from individual elements. This makes it very readily possible to provide a platform 10 of different lengths, in order for the platform 10 according to the invention to be adapted to the length of a loading area of a vehicle. For this purpose, use is made, according to the invention, of the principle of clicking together individual platform elements 10a, 10b.

For this purpose, a first platform element 10a has a locking element 13a, which can latch into a locking holder 13b of the second platform element 10b. FIG. 6 provides the locking element 13a in the form of a hook, which grips behind, and latches in, an edge corresponding to the locking holder 13b. The locking element 13a here is configured such that, when the first locking element 13a is guided together with the second locking element 13b, it is, in the first instance, pushed away from the locking holder 13b, by the latter, and, finally, latches in said locking holder 13b, in order for the first platform element 10a and the second platform element 10b to be locked to one another. For the purpose of releasing this locking, the locking element 13a can be raised again in relation to the locking holder 13b and released as a result.

The platform 10 in FIG. 6, furthermore, on the first platform element 10a, has a recess 14a, into which a protrusion 14b of the second platform element 10b can be introduced. The protrusion 14b and the recess 14a are provided here such that the second platform element 10b can execute a pivoting movement about the transverse direction B of the platform 10 in relation to the first platform element 10a. The recess 14a and the protrusion 14b here are provided on the upper side of the platform 10, and the locking element 13a and the locking holder 13b are provided on the underside of the platform 10. This allows the second platform element 10b with its protrusion 14b to be inserted into the recess 14a of the first platform element 10a from above, in order for the two platform elements 10a, 10b to be positioned, in the first instance, in relation to one another. The second platform element 10b here is swung up in relation to the first platform element 10a, and/or in relation to the horizontal plane, for example through an angle of 45 degrees. From this position, the second platform element 10b can then be swung downward, about the axis B, into the horizontal. The locking element 13a here, in the first instance, is raised by the locking holder 13b, until the locking element 13a, for example in the form of a hook, latches in the locking holder 13b, for example in the form of an edge. The two platform elements 10a, 10b are thus similarly connected to one another.

Using the example of a platform 10, i.e. of a load carrier 10, FIGS. 1 to 6 show various aspects which lead to an advantageous design of the platform 10 in relation to the prior art. It is also possible, however, for the individual aspects to be realized independently of one another. Thus, for example, the lateral rollers 16 can be realized independently of the engagement means 11 according to the invention, i.e. the pulling lug 11, or independently of the platform 10 being constructed in a modular manner according to the invention by platform elements 10a, 10b. It is likewise possible to use, for example, the principle of the latching-in action of the platform elements 10a, 10b on platforms 10 without the latter, for this purpose, having to have the lateral rollers 16 or the engagement means 11 according to the invention.

Figure 7:
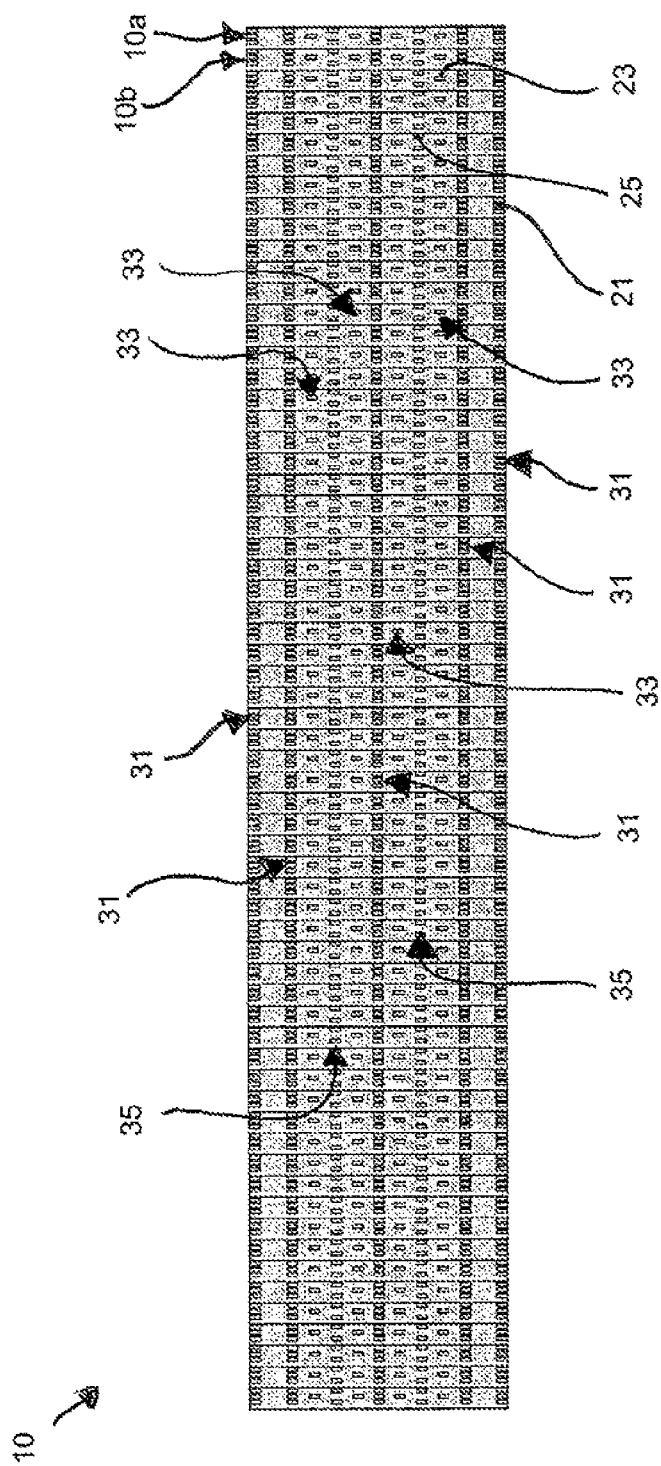
FIG. 7 shows a plan view of a platform according to a further exemplary embodiment of the invention.

A further exemplary embodiment of the platform 10 according to the invention is depicted in FIGS. 7 to 11. FIG. 7, first of all, shows a plan view of the platform 10 according to this exemplary embodiment. The platform 10 comprises a multiplicity of platform elements 10a, 10b lined up in a row one beside the other and connected to one another. The platform elements are arranged to alternate with one another and are fixed to one another. FIG. 7 gives a clear view of the upper side of the platform 10 oriented as it should be for use. The upper side of the platform has a plurality of rollers 21, 23, 25 arranged in rows. To simplify the illustration, only one of the rollers has been provided with a designation. The first rollers 21 are arranged in a number of main rows 31. The platform 10 has a number of, that is to say five, main rows 31 oriented parallel to one another, and one beside the other, in the longitudinal direction of the platform 10. The platform 10 also has a number of first secondary rows 33 and second secondary rows 35. The first secondary rows 33 have the second rollers 23, which are arranged at a greater spacing apart from one another in the longitudinal direction of the platform 10 than the first rollers 21 of the main rows 31. The second secondary rows 35, the platform 10 in the present exemplary embodiment having two of these rows, comprise the third rollers 25. The third rollers 25 are arranged at a greater spacing from one another than the first rollers 21, but at a smaller spacing from one another than the second rollers 23. The respective rollers are assigned to the platform elements 10a, 10b in each case such that three first rollers 21 are arranged one behind the other (in the longitudinal direction of the platform 10) on a platform elements 10a, 10b, that, furthermore, two third rollers 25 are arranged one behind the other (in the longitudinal direction of the platform 10) on each platform element 10a, 10b, and that, finally, in each case one further roller 23 is arranged (in the longitudinal direction of the platform 10) on each platform element 10a, 10b. As seen in the transverse direction of the platform 10, five sets of first rollers 21, four sets of second rollers 23 and two sets of third rollers 25 are located one beside the other on each platform element, wherein the sets of first rollers 21 each comprise three rollers, the sets of second rollers 23 each comprise one roller and the sets of third rollers 25 each comprise two rollers.

Figure 8:
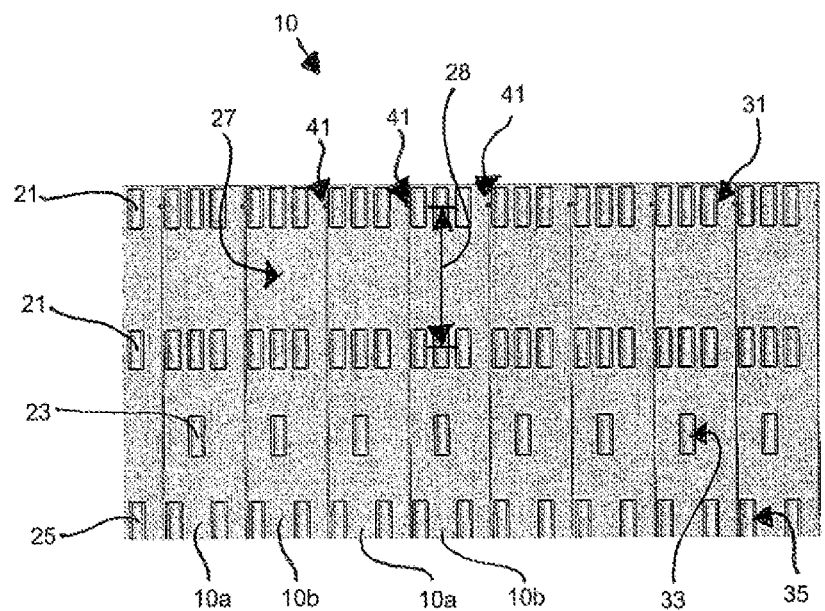
FIG. 8 shows a detail-form view of the plan view from FIG. 7.

The arrangement of the rollers can also be seen in detail in FIG. 8. That detail of the loading surface 27 of the platform 10 which is illustrated in FIG. 8 also shows, in particular, the platform elements 10a, 10b arranged in an alternating sequence. The platform elements 10a, 10b are positioned relative to one another, and aligned in relation to one another in the longitudinal direction of the platform 10, by means of securing bolts 41. Also indicated is a spacing 28 between two adjacent rows of rollers, in this case the spacing between two adjacent main rows 31 comprising first rollers 21. According to the invention, this spacing is smaller than, or equal to, 400 mm.

Figure 9:
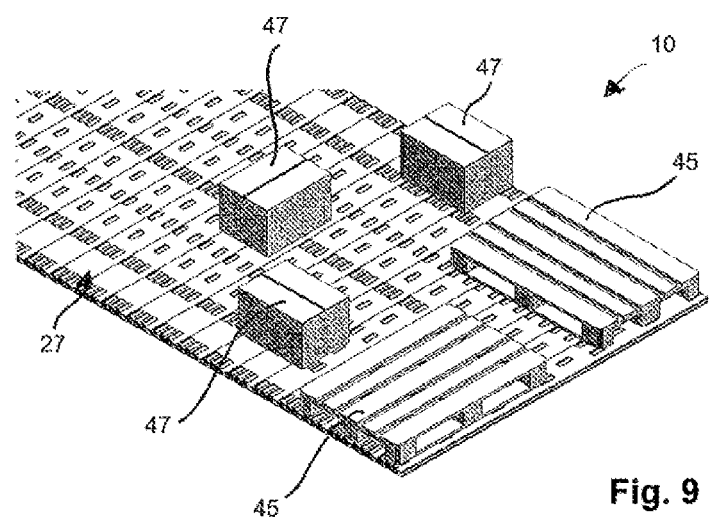
FIG. 9 shows a three-dimensional illustration of a loaded platform according to FIGS. 7 and 8.

The functioning of the first, second and third rollers on the loading surface 27 of the platform 10 is indicated in FIG. 9. The spacings between the main and secondary rows, shown in detail in FIGS. 7 and 8, makes it possible to transport, for example, cartons 47 or pallets 45, preferably designed as Europool pallets with an edge length of essentially 800 mm×1200 mm, such that always at least two adjacent rollers support the load items 45, 47 and thus allow easy displacement along the platform 10.

FIG. 10 portrays, once again, the arrangement of the alternating platform elements 10a, 10b in a coupled state. As far as the recesses 14a and protrusions 14b are concerned, reference is made to what has been said above. In each case three first rollers 21, each in separate roller casings 29, are incorporated on the upper side of the platform 10, that is to say on the side of the loading surface 27. On the opposite, lower side of the platform 10, the rollers 19 are accommodated in roller casings 18. The securing bolts 41 are arranged in each case in the connecting region between two adjacent platform elements 10a, 10b, preferably such that they correspond with two respectively corresponding recesses in the adjacent platform elements 10a, 10b, in order to make possible the desired positioning in the transverse direction of the platform 10.

The underside of the platform 10 that is finally shown in FIG. 11 shows a preferred alternative arrangement of the rollers 19 for carrying the platform 10 according to the second exemplary embodiment of figures to 10. The multiplicity of platform elements 10a, 10b, which are arranged to alternate with one another, have different spacings between the rollers 19 arranged in each case on the platform elements 10a, 10b. The rollers on the platform elements 19 here are arranged at a first spacing 37 from one another, whereas the rollers 19 on the second platform element 10b are arranged at a second spacing 39 from one another in each case, this second spacing differing from the first spacing 37 between the rollers 19 on the platform element 10a. The spacing 39 is preferably two to three times the size of the spacing 37. This gives rise to a better distribution of load over the multiplicity of rollers 19—as seen in relation to the overall surface area of the platform 10—as a result of which a higher level of stability of the platform 10 as a whole is ensured.

The invention claimed is:

1. A platform for use in a logistics system, the platform adapted to be transferred onto a loading area of a vehicle in a haulage direction (A) and also adapted to be received from the loading area of a vehicle in the haulage direction (A), the platform comprising:
 at least one first platform element; and
 at least one second platform element that can be locked to and released from the at least one first platform element,
 the first platform element having a locking element and the second platform element having a locking holder provided opposite the locking element such that the locking holder of the second platform element can latch into the locking element of the first platform element,
 wherein the first platform element has a recess and the second platform element has a protrusion that can engage the recess by pivoting movement about a horizontal axis (B) extending perpendicular to the haulage direction (A), and
 wherein the platform includes at least one lateral edge that defines lateral dimensions of the platform that are adapted to the loading area of the vehicle, such that the platform fits within the loading area of the vehicle, and the lateral dimensions of the platform include a longitudinal dimension and a transverse dimension shorter than the longitudinal dimension, with the longitudinal dimension also extending along the haulage direction.

2. The platform of claim 1, further comprising:
 at least one roller located along the at least one lateral edge of the platform, the at least one roller configured to rotate about a vertical axis (C) that is generally perpendicular to the lateral dimensions of the platform, and the at least one roller protruding beyond the lateral dimensions of the platform.

3. The platform of claim 2, wherein one of the at least one roller is provided on a corner of the platform.

4. The platform of claim 1, further comprising:
 an engagement means configured to engage a haulage means when the haulage means is used to pull the platform from the loading area of the vehicle in the haulage direction (A).

5. The platform of claim 1, further comprising:
 an underside of the platform configured to face downwardly when the platform is located in the loading area of the vehicle; and
 a first plurality of rollers supported in first roller casings incorporated in the underside of the platform, the first roller casings and the platform configured to be shifted on the first plurality of rollers in the haulage direction (A).

6. The platform of claim 5, wherein the platform with the first plurality of rollers and first roller casings has an overall height of not more than 50 millimeters in a vertical direction perpendicular to the lateral dimensions of the platform.

7. The platform of claim 5, further comprising:
 a loading surface configured to face upwardly when the platform is located in the loading area of the vehicle; and a second plurality of rollers that extend, at least in part, out of the loading surface.

8. The platform of claim 7, wherein the second plurality of rollers are supported in at least one of: the first roller casings individually, the first roller casings in groups, and second roller casings separate from the first roller casings.

9. The platform of 7, wherein the second plurality of rollers are arranged one beside the other along the longitudinal dimension of the platform in two or more rows.

10. The platform of claim 9, wherein spacings are defined between any adjacent pair of rows in the two or more rows which are each in a range of not more than 400 millimeters.

11. The platform of claim 5, wherein the first roller casings are distributed on the at least one first platform element and the at least one second platform element, with the first roller casings on the at least one first platform element being arranged at a first spacing from one another, and the first roller casings on the at least one second platform element being arranged at a second spacing that differs from the first spacing.

12. The platform of claim 11, wherein the platform includes a plurality of first platform elements and a plurality of second platform elements that are arranged to alternate with one another and are locked to one another.

13. The platform of claim 1, wherein the platform consists essentially of aluminum.

14. The platform of claim 1, wherein the platform is accessible by common industrial trucks.

15. The platform of claim 1, wherein the platform is configured to bear a loaded platform.

16. The platform of claim 1, wherein the at least one first platform element and the at least one second platform element are fixed relative to one another along the transverse dimension of the platform by securing bolts that are each arranged between any pair of adjacent platform elements.

17. The platform of claim 16, wherein the at least one first platform element and the at least one second platform element are parallel to one another and in alignment along the longitudinal dimension of the platform.

18. A platform for use in a logistics system, the platform adapted to be transferred onto a loading area of a vehicle in a haulage direction (A) and also adapted to be received from the loading area of a vehicle in the haulage direction (A), the platform comprising:

at least one first platform element at least one second platform element that can be locked to and released from the at least one first platform element;

an engagement means configured to engage a haulage means when the haulage means is used to pull the platform from the loading area of the vehicle in the haulage direction (A); and a compression spring configured to push the engagement means outward from the platform in the haulage direction (A), the first platform element having a locking element and the second platform element having a locking holder provided opposite the locking element such that the locking holder of the second platform element can latch into the locking element of the first platform element, wherein the first platform element has a recess and the second platform element has a protrusion that can engage the recess by pivoting movement about a horizontal axis (B) extending perpendicular to the haulage direction (A), and wherein the platform defines at least one lateral edge that defines lateral dimensions of the platform that are adapted to the loading area of the vehicle, such that the platform fits within the loading area of the vehicle.

19. The platform of claim 18, wherein the platform is configured and the compression spring is dimensioned such that the engagement means can be pushed all the way into the platform and accommodated within the lateral dimensions of the platform.

* * * * *

UNITED STATES PATENT AND TRADEMARK OFFICE
CERTIFICATE OF CORRECTION

| | | |
|---|---|---|
| PATENT NO. | : 9,440,769 B2 | Page 1 of 1 |
| APPLICATION NO. | : 13/993921 | |
| DATED | : September 13, 2016 | |
| INVENTOR(S) | : Heinz Buse | |

It is certified that error appears in the above-identified patent and that said Letters Patent is hereby corrected as shown below:

Specification:

In column 9, line 59, "second exemplary embodiment of figures to 10. The multi-" should read -- second exemplary embodiment of figures 7 to 10. The multi- --.

Claims:

In column 11, line 7, Claim 9, "9. The platform of 7, wherein the second plurality of" should read -- 9. The platform of claim 7, wherein the second plurality of --.

In column 12, line 8, Claim 18, "at least one first platform element" should read -- at least one first platform element; --.

Signed and Sealed this
Twenty-ninth Day of November, 2016

Michelle K. Lee
*Director of the United States Patent and Trademark Office*